Patented Dec. 16, 1930

1,785,131

UNITED STATES PATENT OFFICE

GEORGE LUTZ, OF ROCKY RIVER, OHIO, ASSIGNOR TO THE GRASSELLI CHEMICAL COMPANY, OF CLEVELAND, OHIO, A CORPORATION OF DELAWARE

ZINC-CHLORIDE-BASE FLUX

No Drawing. Application filed December 26, 1929. Serial No. 416,756.

Zinc chloride is the base of a large number of commercial fluxes used in soft soldering of metals.

It is used in aqueous or alcholic solutions with or without the addition of various compounds, such as hydro-chloric acid, ammonium chloride, fusel oils, etc.

I have found that the addition of sulfonated vegetable oil compounds, such as the sulfonated vegetable oils themselves, their ammonium and alkali metal salts, etc., to zinc chloride improves the spreading and wetting properties of fluxes in which zinc chloride is the base, or main active ingredient, particularly when used on oily metals.

Sulfonated vegetable oil compounds are well known in the textile industry as Turkey red oils, or under such trade names as Para soaps, Monopole soaps, Monopole oils, etc. They are obtained by sulfonation of various vegetable oils, among which castor oil, corn oil and cottonseed oils are most commonly used. They are used in the textile industry as such or after neutralization in the form of their ammonium or alkali-metal salts.

Additions of from less than about 1% to several per cent of a sulfonated castor oil, sulfonated corn or sulfonated cottonseed oil compound to zinc chloride solutions produces soft soldering fluxes of excellent spreading and wetting power.

Zinc chloride base fluxes containing a sulfonated vegetable oil are particularly advantageous where it is desired to solder oily or greasy metals where straight zinc chloride fluxes do not penetrate through the film of oil or grease, whereas the compounded fluxes of my invention "cut through" such films and allow the zinc chloride to act upon the metal.

A very efficient flux consists, for instance, in a solution of the following composition, the parts being by weight:

20 parts 20° Bé. hydrochloric acid.
50 parts of 70% zinc chloride solution.
2 parts ammonium chloride crystals.
20 parts denatured alcohol.
8 parts water.
1 part sulfonated castor oil.

Applied in the usual manner, this flux produces an excellent spread and adhesion of the solder, the flux itself seems to "wet" the metal pieces much better than a similar flux in which the sulfonated castor oil has been omitted.

The addition of sulfonated vegetable oil compounds in varying proportions to zinc chloride base fluxes allows of a convenient manner of modifying their properties, whereby they can be adjusted to any particular condition obtained in special soldering jobs.

I claim:

1. As a new composition of matter a soft soldering flux comprising a sulfonated vegetable oil compound and zinc chloride.

2. As a new composition of matter a soft soldering flux comprising a solution containing zinc chloride and a sulfonated vegetable oil compound.

3. As a new composition of matter a soft soldering flux comprising an aqueous-alcoholic solution containing zinc chloride and a sulfonated vegetable oil.

In testimony whereof, I affix my signature.

GEORGE LUTZ.